(12) United States Patent
Tsubokura et al.

(10) Patent No.: US 7,626,654 B2
(45) Date of Patent: Dec. 1, 2009

(54) DISPLAY DEVICE

(75) Inventors: Masaki Tsubokura, Mobara (JP); Yuji Azuma, Mobara (JP); Tatsuyuki Fumikura, Mobara (JP)

(73) Assignees: Hitachi Displays, Ltd., Chiba-ken (JP); Hitachi Display Devices, Ltd., Chiba-ken (JP)

( * ) Notice: Subject to any disclaimer, the term of this patent is extended or adjusted under 35 U.S.C. 154(b) by 169 days.

(21) Appl. No.: 11/602,245

(22) Filed: Nov. 21, 2006

(65) Prior Publication Data

US 2007/0115401 A1    May 24, 2007

(30) Foreign Application Priority Data

Nov. 21, 2005    (JP)    ............................. 2005-335421

(51) Int. Cl.
*G02F 1/1333*    (2006.01)
(52) U.S. Cl. .......................................... 349/60; 349/58
(58) Field of Classification Search ........................ None
See application file for complete search history.

(56) References Cited

U.S. PATENT DOCUMENTS

| | | | |
|---|---|---|---|
| 6,507,377 B1 * | 1/2003 | Jung | 349/60 |
| 6,654,078 B1 * | 11/2003 | Kato et al. | 349/58 |
| 6,828,721 B2 * | 12/2004 | Wakita | 313/491 |
| 2002/0154474 A1 * | 10/2002 | Merz et al. | 361/683 |
| 2007/0023397 A1 * | 2/2007 | Hohne et al. | 217/36 |

FOREIGN PATENT DOCUMENTS

| | | | |
|---|---|---|---|
| JP | 7-168161 A | * | 7/1995 |
| JP | 8-262414 A | * | 10/1996 |
| JP | 9-105917 A | * | 4/1997 |

* cited by examiner

*Primary Examiner*—Mike Stahl
(74) *Attorney, Agent, or Firm*—Antonelli, Terry, Stout & Kraus, LLP.

(57) ABSTRACT

An object of the invention is to facilitate attachment of a spacer to a support member in an assembling process of a liquid crystal display device. A display device includes: a display panel, a support member that supports the display panel and a spacer that is interposed between a cut end surface of the display panel and a first surface of the support member, the first surface facing the cut end surface of the display panel. The support member has a recess that opens through the first surface and a second surface, which is connected to the first surface and extends away from the display panel. The spacer includes a spacer position securing portion inserted in the space of the recess of the support member and a buffer portion that is integral with the spacer position securing portion and protrudes from the open end at the first surface of the support member toward the cut end surface of the display panel.

7 Claims, 16 Drawing Sheets

DISPLAY DEVICE

The present application claims priority from Japanese application JP2005-335421 filed on Nov. 21, 2005, the content of which is hereby incorporated by reference into this application.

BACKGROUND OF THE INVENTION

1. Field of the Invention

The present invention relates to a display device, and particularly to a technology that is effectively applied to a display device, such as a liquid crystal display device, in which a display panel is supported by a support member.

2. Description of the Related Arts

Conventionally, a display panel of a liquid crystal display device is usually supported by a support member and a frame member.

The support member is, for example, made of shaped resin and supports the display panel at the backside thereof. The frame member integrally holds the display panel, circuit components connected to the display panel, optical components and the like, and supports the display panel at the front side (forward side) thereof.

The support member has a projection for positioning the display panel, in other words, the image display area. The projection of the support member has, for example, a surface (hereinafter referred to as the first surface) that faces the side (cut end surface) of the display panel. The first surface has, for example, an annular shape facing toward the center of the display panel surrounds the sides of the display panel. Thus, when the display panel fits in a recessed area surrounded by the first surface, the display panel is supported and positioned.

Although the area surrounded by the first surface preferably has, for example, the same size as the external dimension of the display panel, the display panel has a variation in the external dimension, for example, due to component tolerances and thermal shrinkage (thermal expansion). Thus, the area surrounded by the first surface of the support member needs to be larger than the nominal external dimension of the display panel. This creates a certain amount of gap between the cut end surface of the display panel and the first surface of the support member.

The variation in the external dimension of each of the panels increases as the external dimension of the display panel increases. Thus, for a display panel with a larger external dimension, a correspondingly larger gap is required between the cut end surface of the display panel and the first surface of the support member.

However, the gap between the cut end surface of the display panel and the first surface of the support member allows the display panel to move horizontally and vertically by the amount of the gap, so that a larger external dimension of the display panel undesirably results in reduced positioning accuracy of display panel.

A known method for preventing the reduced positioning accuracy due to the gap involves inserting a buffer spacer 3 between the cut end surface 2a of the display panel 2 and the first surface 1a of the support member 1, as shown in FIGS. 22 and 23. The buffer spacer 3 is made of, for example, elastic material, such as silicon rubber, urethane and sponge, and absorbs vibration and impact to prevent breakage of the display panel 2.

The buffer spacer 3 is affixed to the first surface 1a of the support member 1 or a surface 1c that faces the back side 2b of the display panel 2 using an adhesive 16, for example as shown in FIG. 23 or 24. FIGS. 23 and 24 are cross-sectional views taken along the line F-F' shown in FIG. 22.

SUMMARY OF THE INVENTION

In the conventional liquid crystal display device, the method in which the buffer spacer 3 is inserted between the cut end surface 2a of the display panel 2 and the first surface 1a of the support member 1 involves affixing the buffer spacer 3 to the support member 1 using the adhesive 16. This undesirably results in poor workability. In particular, when the buffer spacer 3 is affixed to the first surface 1a of the support member 1, the buffer spacer 3 is easily misaligned, resulting in poor workability.

Furthermore, when the adhesive 16 is used to affix the buffer spacer 3, for example, externally applied forces and reduced adhesiveness due to aging and heat undesirably deform the buffer spacer 3 or peel the buffer spacer 3 off the support member 1 so that the position of the buffer spacer 3 is shifted.

An object of the invention is to provide a technology capable of facilitating attachment of the spacer to the support member, for example, in an assembling process of a liquid crystal display device.

Another object of the invention is to provide a technology capable of preventing a positional shift of the spacer interposed between the display panel and the support member.

These and other objects and novel features of the invention will become apparent from the following description herein and accompanying drawings.

The representative devices of the invention disclosed in this application are summarized as follows:

(1) There is provided a display device comprising: a display panel, a support member that supports the display panel and a spacer that is interposed between a cut end surface of the display panel and a first surface of the support member, the first surface facing the cut end surface of the display panel. The support member has a recess that opens through the first surface and a second surface, which is connected to the first surface and extends away from the display panel. The spacer includes a spacer position securing portion inserted in the space of the recess of the support member and a buffer portion that is integral with the spacer position securing portion and protrudes from the open end at the first surface of the support member toward the cut end surface of the display panel.

(2) In the display device described in (1), the recess of the support member is configured such that the area of the open end at the second surface is equal to or greater than the area of the external shape of the spacer position securing portion at the surface parallel to the second surface.

(3) In the display device described in (1), the spacer position securing portion has a portion whose width in the direction parallel to the first and second surfaces of the support member is wider than the width of the open end at the first surface.

(4) There is a is provided a display device comprising: a display panel, a support member that supports the display panel, a spacer that is interposed between a cut end surface of the display panel and a first surface of the support member, the first surface facing the cut end surface of the display panel, and a frame member that supports a surface connected to the cut end surface of the display panel. The support member has a recess that opens through the first surface and a second surface, which is connected to the first surface and extends away from the display panel. The spacer includes a spacer position securing portion inserted in the space of the recess of the support member and a buffer portion that is integral with the spacer position securing portion and protrudes from the open end at the first surface of the support member toward the cut end surface of the display panel. The spacer position securing portion has a surface that is inclined with respect to the second surface of the support member such that the surface becomes further away from the second surface at more distal positions from the open end at the first surface of the support member. The frame member has a projection that is disposed on a surface opposite to and parallel to the second surface of the support member and in the area corresponding to the opening of the support member such that the projection is in contact with the inclined surface of the spacer position securing portion.

(5) In the display device described in (1) or (4), the spacer is made of an elastic material.

(6) In the display device described in (5), a plurality of the spacers are provided and at least one of the spacers has a modulus of elasticity different from those for the other spacers.

(7) In the display device described in (1) or (4), the display panel is a liquid crystal display panel.

In the display device of the invention, as described with reference to the device of (1), the cut end surface of the display panel is supported by the support member having the recess that opens through the first and second surfaces as well as the spacer integrally formed of the spacer position securing portion inserted in the recess of the support member with the buffer portion that protrudes from the open end at the first surface of the support member toward the cut end surface of the display panel. In this way, the movement of the spacer position securing portion is restricted within the space of the recess of the support member, so that the operator does not have to affix the spacer with an adhesive, but can fix the spacer without any concern about positional shifts or the like.

The recess of the support member thus configured to open through the first and second surfaces allows the spacer to be attached, for example, by inserting the spacer position securing portion into the opening of the recess at the second surface through the space of the recess of the support member, thereby providing improved workability in the attachment process of the spacer.

As described with reference to the device of (2), the recess of the support member is configured such that the area of the open end at the second surface is equal to or greater than the area of the external shape of the spacer position securing portion at the surface parallel to the second surface. To prevent a positional shift of the spacer, for example, a post-attachment shift due to vibration or impact, the area of the open end at the second surface is preferably equal to the area of the external shape of the spacer position securing portion, so that the sides of the space of the recess are in close contact with the spacer position securing portion. However, when the sides of the space of the recess are in close contact with the spacer position securing portion, for example, variation in external dimensions due to component tolerances and the like may result in poor attachment workability. To avoid the reduced workability, for example, the area of the open end at the second surface is configured to be larger so as to create a certain amount of gap between the sides of the space of the recess and the spacer position securing portion.

As described with reference to the device of (3), the spacer position securing portion preferably has a portion whose width in the direction parallel to the first and second surfaces of the support member is wider than the width of the open end at the first surface. This prevents the spacer, after it is attached to the support member, from being shifted in the direction perpendicular to the first surface and coming off the support member. The shape of such a spacer position securing portion may be, for example, a wedge shape and a columnar shape having an arcuate or polygonal bottom parallel to the second surface.

The spacer whose shape and attachment procedure are described with reference to the device of (1) to (3) can move in the direction perpendicular to the second surface of the support member. However, the second surface of the support member is usually in contact with the frame member that integrally holds the display panel, the support member, circuit boards, optical components and the like. Thus, the movement of the spacer is also restricted in the direction perpendicular to the second surface of the support member.

As mentioned above, the second surface of the support member is usually in contact with the frame member. Thus, for example, as described with reference to the device of (4), the spacer position securing portion may be provided with the inclined surface, while the frame member may be provided with the projection that comes into contact with the inclined surface of the spacer position securing portion. In this way, for example, when the spacer is attached to the support member and then the display panel is placed, followed by the overlying frame member, the projection of the frame member comes into contact with the inclined surface of the spacer position securing portion. Upon contact, the spacer position securing portion receives a force from the projection of the frame member. The spacer then slides in the direction perpendicular to the first surface of the support member and moves toward the display panel. Thus, for example, the projection of the frame member can control the position of the spacer in the direction perpendicular to the first surface of the support member such that there is no gap between the spacer and the cut end surface of the display panel.

In such a display device, as described with reference to the device of (5), the spacer is preferably made of elastic material. When the spacer is made of elastic material, for example, the spacer can absorb vibration and impact, thereby preventing breakage of the display panel. Furthermore, when the gap between the cut end surface of the display panel and the first surface of the support member is narrow due to component tolerances and the like, the spacer can be elastically deformed to support the display panel.

Such a display panel is usually set up and used with the display panel in an upright position, that is, with cut end surfaces of the display panel oriented in horizontal and vertical directions. In this case, the spacer attached to a surface that faces the lower end surface of the display panel receives a force corresponding to the weight of the display panel. Thus, the spacer disposed at the lower side of the display panel is preferably made of a material more resistant to deformation than those for the other spacers. As described with reference to the device of (6), the modulus of elasticity of the spacer can be changed depending on its orientation at the time of installation so as to prevent a positional shift of the display panel due to the deformation of the spacer.

The devices described in (1) to (6) can be applied to any display device in which the display panel is supported by the support member. Display panels supported by the support member include, for example, a liquid crystal display panel described in the device (7).

DESCRIPTION OF THE PREFERRED EMBODIMENTS

Figure 1:
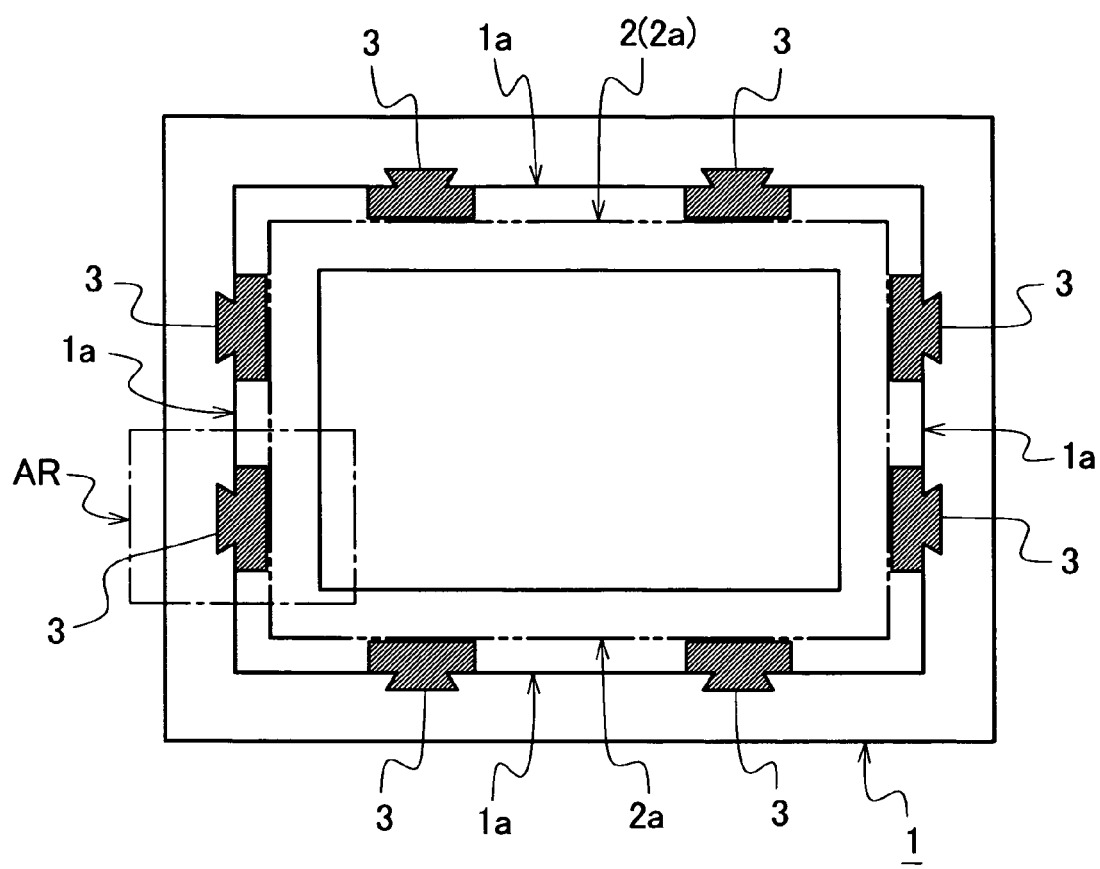
FIG. 1 is a diagrammatic view for explaining the main portion of the display device of the invention and is a front view showing a schematic configuration of a support member and a spacer.

The invention will be described below in detail along with embodiments (examples) thereof with reference to the drawings. Throughout the drawings for explaining the examples, those having same functions have same reference characters and redundant description thereof will be omitted.

Figure 2:
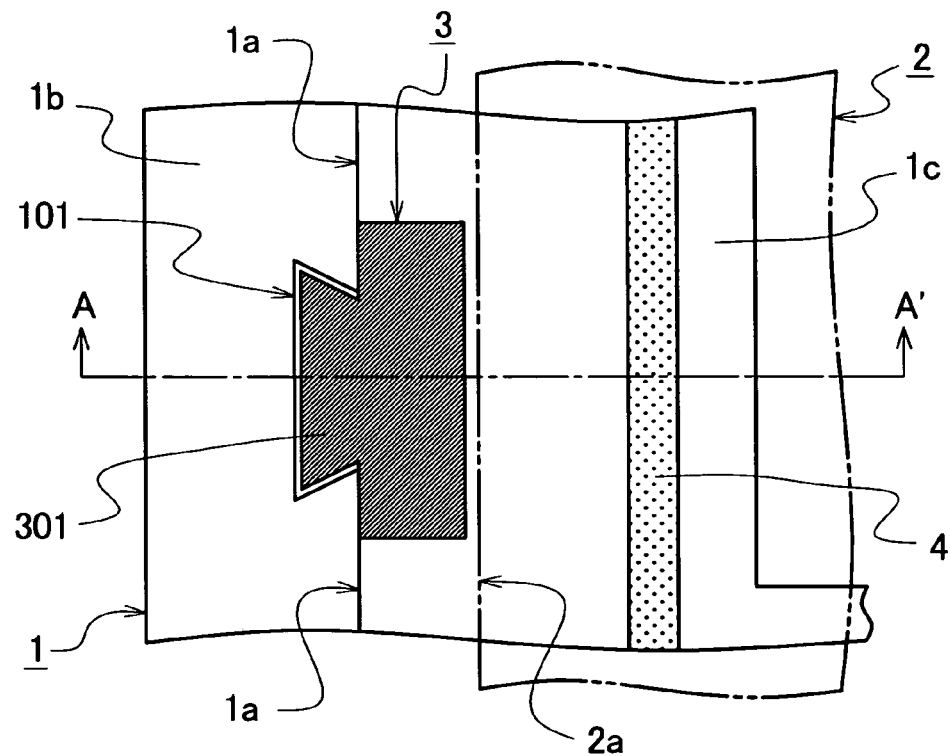
FIG. 2 is a diagrammatic view for explaining the main portion of the display device of the invention and is an enlarged partial view of the area AR shown in FIG. 1.
Figure 3:
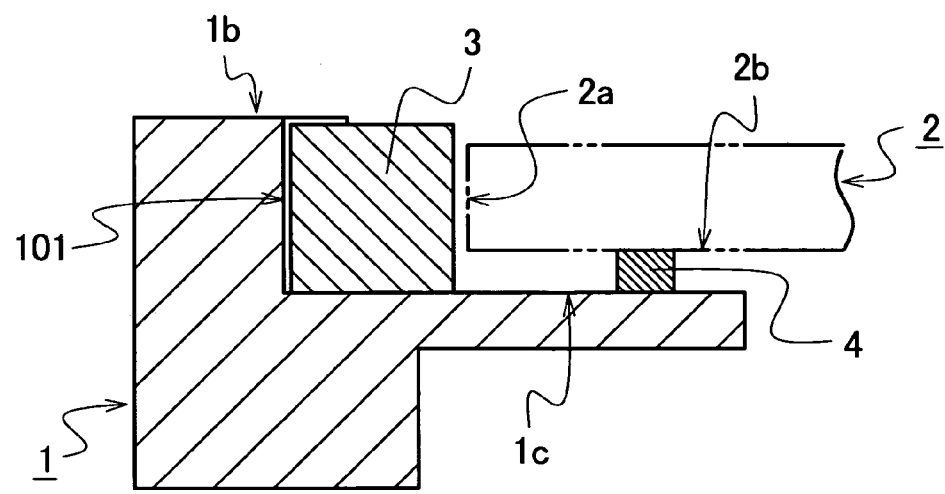
FIG. 3 is a diagrammatic view for explaining the main portion of the display device of the invention and is a cross-sectional view taken along the line A-A' shown in FIG. 2.
Figure 4:
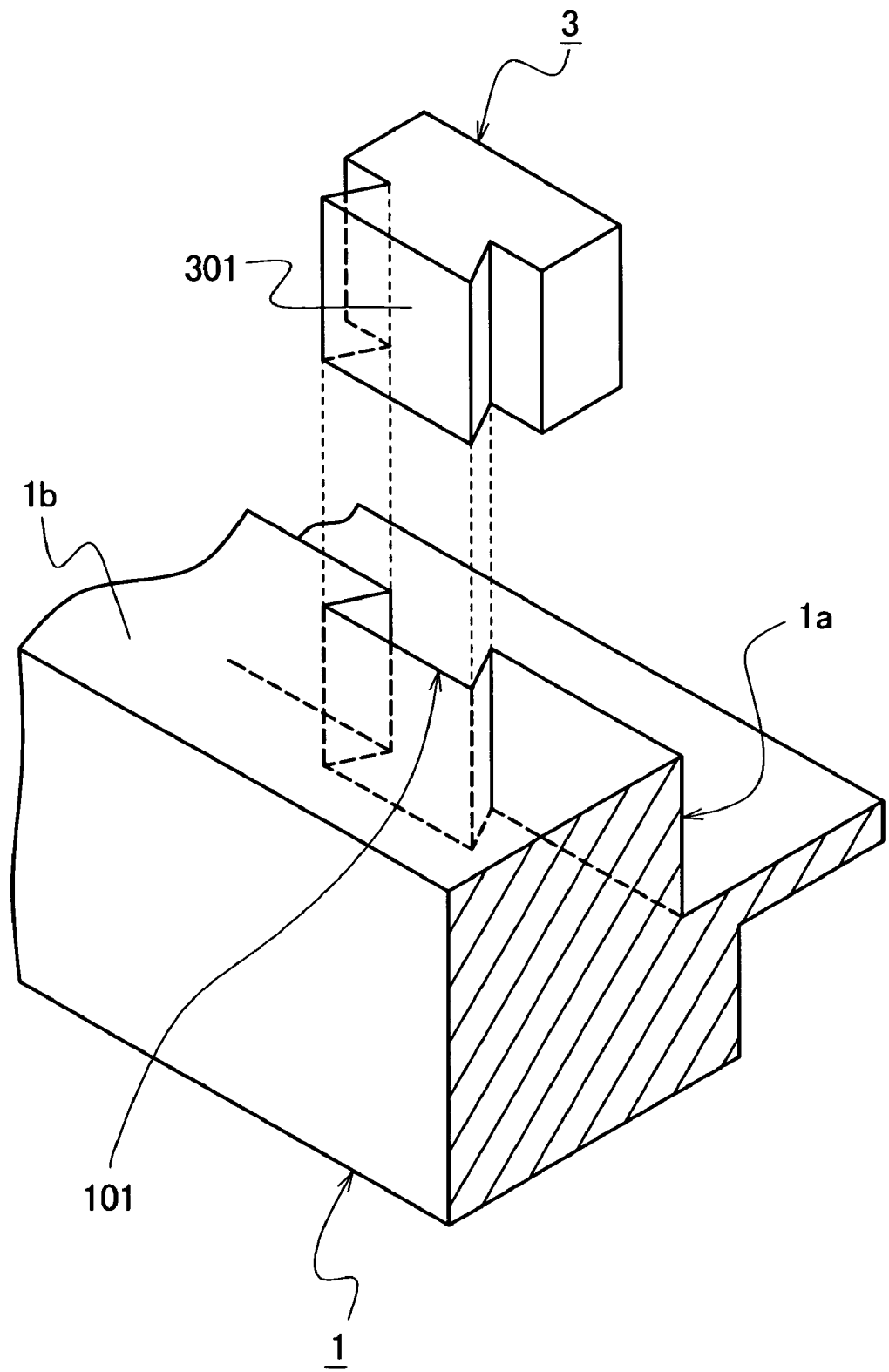
FIG. 4 is a diagrammatic view for explaining the main portion of the display device of the invention and is an exploded schematic view for explaining how to attach the spacer.

FIGS. 1 to 4 are diagrammatic views for explaining the main portion of the display device of the invention. FIG. 1 is a front view showing a schematic configuration of a support member and a spacer. FIG. 2 is an enlarged partial view of the area AR shown in FIG. 1. FIG. 3 is a cross-sectional view taken along the line A-A' shown in FIG. 2. FIG. 4 is an exploded schematic view for explaining how to attach the spacer.

The display device of the invention is, for example, a display device like a liquid crystal display device, and includes a display panel, a support member that supports the display panel and a spacer that is interposed between the display panel and the support member.

In the support member 1, for example as shown in FIGS. 1 to 3, a first spacer 3 is attached to a first surface 1a that faces a cut end surface 2a of the display panel 2. A second spacer 4 is attached to a surface 1c that faces the back surface 2b of the display panel 2.

The support member 1 also has a recess 101 that opens through the first surface 1a and a second surface 1b, which is connected to the first surface 1a and extends away from the display panel 2. The recess 101 of the support member 1 forms the shape of the open end at the second surface 1b to be a trapezoid in which two sides are parallel to the first surface and one side on the first surface is shorter than the other side, for example as shown in FIG. 2. The first spacer 3 has a projection (hereinafter referred to as a spacer position securing portion) 301 conformal to the recess 101 of the support member 1. That is, the first spacer 3 is, for example as shown in FIG. 4, attached by fitting the spacer position securing portion 301 into the recess 101 of the support member 1 in the same manner as a mortice and tenon joint in woodworking.

Thus, in the display panel of the invention, the first spacer 3 is configured such that the spacer position securing portion 301 simply fits in the recess 101 of the support member 1, resulting in an easier operation than, for example, in the case of using an adhesive to affix the first spacer 3 to the support member 1.

The spacer position securing portion 301 fitted in the recess 101 of the support member 1 restricts the movement of the first spacer 3 in the direction parallel to the first surface 1a and the second surface 1b as well as in the direction perpendicular to the first surface 1a. As described later, a frame member overlies the second surface 1b of the support member 1. Thus, the movement of the first spacer 3 is also restricted in the direction perpendicular to the second surface 1b.

In the example shown in FIGS. 2 and 3, there are gaps at the sides of the recess 101 of the support member 1 and at the front surface of the spacer position securing portion 301. These gaps provide clearance for variation in external dimensions, for example, due to component tolerances and thermal shrinkage (expansion).

The second spacer 4 is affixed to the support member 1, for example, with an adhesive (not shown).

The first spacer 3 and the second spacer 4 are made of, for example, highly impact-resistant material, including rubber material, such as silicon rubber, urethane resin and sponge-like resin.

The support member 1 is formed, for example, by plastic molding.

Figure 5:
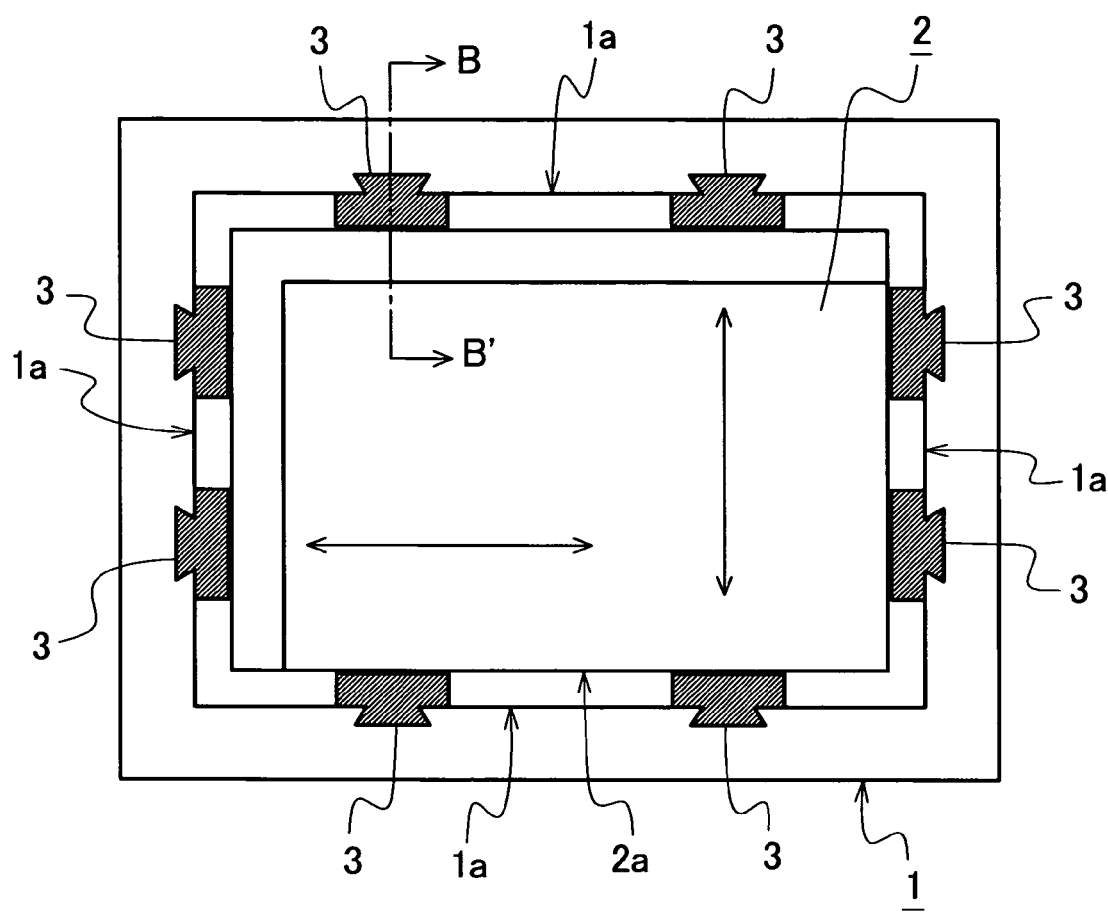
FIG. 5 is a diagrammatic view showing one exemplary configuration of the display device to which the invention is applied and is a front view of the display device.
Figure 6:
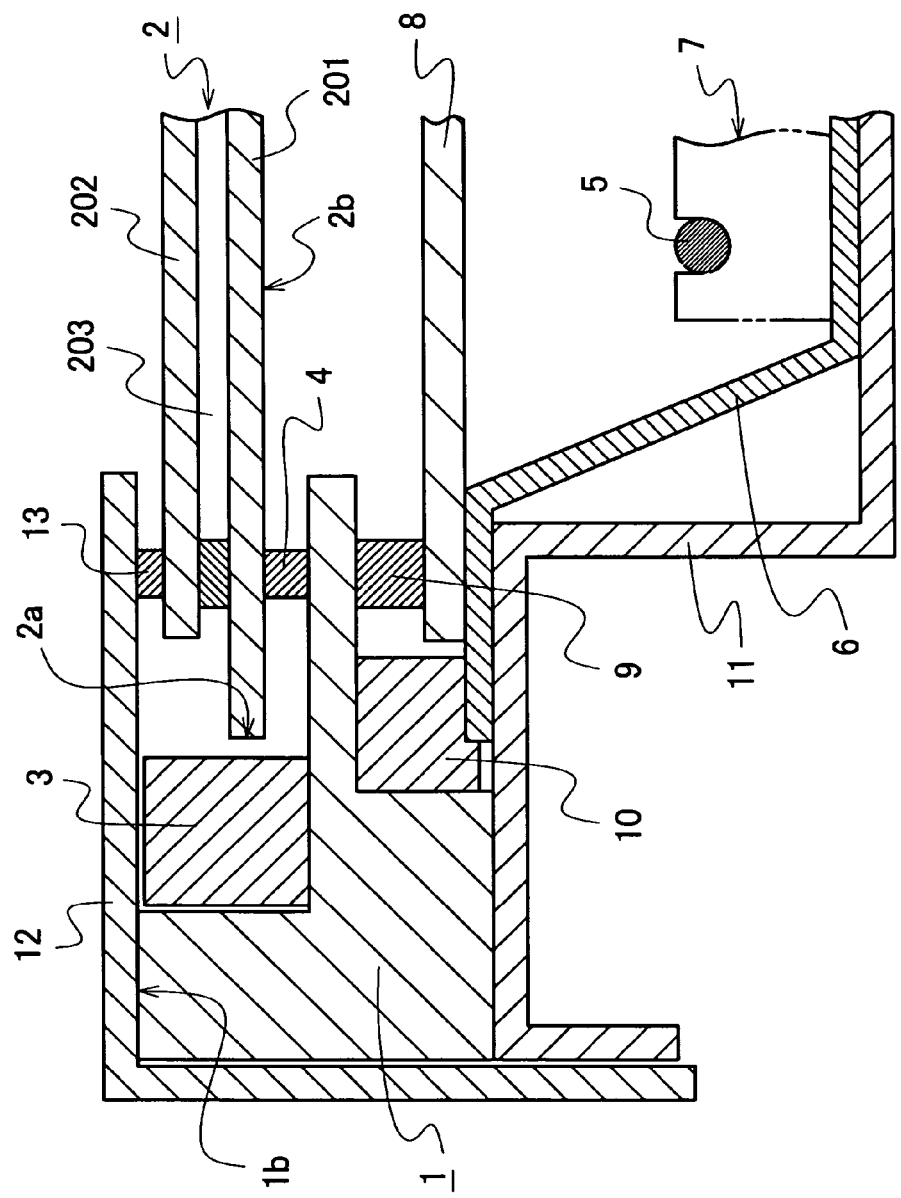
FIG. 6 is a diagrammatic view showing one exemplary configuration of the display device to which the invention is applied and is a cross-sectional view taken along the line B-B' shown in FIG. 5.

FIGS. 5 and 6 are diagrammatic views showing one exemplary configuration of the display device to which the invention is applied. FIG. 5 is a front view of the display device. FIG. 6 is a cross-sectional view taken along the line B-B' shown in FIG. 5. In the front view of FIG. 5, a frame member (upper frame) is omitted for clarity of illustration of the relationship between the first spacer and the display panel.

The display device of the invention is, as described above, a display device including the support member 1 that supports the display panel 2 and the spacers 3, 4 that are interposed between the display panel 2 and the support member 1. One example of such a display device is a liquid crystal display device, and a schematic configuration of the liquid crystal display device to which the support member 1 and the first spacer 3 configured as shown in FIGS. 1 to 3 are applied will be described. The exemplary liquid crystal display device is a transmissive liquid crystal display device with a backlight unit. The backlight unit in this example is placed immediately underneath the display panel.

The liquid crystal display device has, for example as shown in FIGS. 5 and 6, the liquid crystal display panel 2 with liquid crystal material 203 sealed between two substrates 201 and 202. The liquid crystal display panel 2 is supported by the support member 1. Specifically, the backside substrate 201 is supported on the support member 1 via the second spacer 4. The cut end surface 2a of the liquid crystal display panel 2 faces the first surface 1a (not shown) of the support member 1, and the first spacer 3 is interposed between the cut end surface 2a of the liquid crystal display panel 2 and the first surface 1a of the support member 1. Although in FIGS. 5 and 6, there is a gap between the cut end surface 2a of the liquid crystal display panel 2 and the first spacer 3, their configuration is not limited thereto, but the first spacer 3 may be in contact with the cut end surface 2a of the liquid crystal display panel 2.

As shown in FIG. 6, a backlight unit 5, 6, 7 and an optical sheet 8 are disposed on the opposite side of the support member 1 from the liquid crystal display panel 2. In the case of an underneath-type backlight unit, for example as shown in FIG. 6, one or more light sources 5, such as cold cathode fluorescent tubes, followed by a reflector plate 6, are disposed behind the liquid crystal display panel 2. The light source 5 is supported by a light source support member 7 disposed on the reflector plate 6.

Between the backlight unit 5, 6, 7 and the liquid crystal display panel 2 is disposed the optical sheet 8 that includes a sheet-like optical member, such as an optical diffuser plate for diffusing light from the backlight unit. The end of the optical sheet 8 is supported, for example, between the support member 1 and the reflector plate 6 with a third spacer 9 interposed between the support member 1 and the optical sheet 8. The third spacer 9 is, for example, affixed to the support member 1 with an adhesive (not shown).

A fourth spacer 10 is disposed adjacent to the side of the optical sheet 8. The fourth spacer 10 is attached to the support member 1, for example, in a manner similar to the way the first spacer 3 is attached. Although not shown, the optical sheet 8 is also supported by an optical sheet support member, called a pin mold, attached to the reflector plate 6 in order to prevent the central area of the optical sheet 8 from bending.

The backlight units 5, 6, and 7 are housed, for example, in a first frame member (lower frame) 11, and the optical sheet 8, the support member 1 and the display panel 2 are overlaid in front of the backlight unit. A second frame member (upper frame) 12 is then overlaid in front of the support member 1 and the display panel 2, and the upper frame 11 and the lower frame 12 are clamped together, for example, by screws, so that the backlight unit 5, 6, 7, the optical sheet 8, the display panel 2 and the like are integrally held together. On the upper frame 12 is provided a fifth spacer 13, through which the liquid crystal display panel 2 is supported. The fifth spacer 13 is affixed to the upper frame 12, for example, with an adhesive (not shown).

The open end at the second surface 1b of the support member 1 is covered by the upper frame 12. Thus, the upper frame 12 can prevent the movement of the first spacer 3 in the direction perpendicular to the second surface 1b of the support member 1.

Such a liquid crystal display device, for example as shown in FIG. 5, may receive vibration or impact having vertical and/or horizontal components. The first spacer 3 made of elastic material attached in the manner shown in FIG. 4 can absorb the vibration or impact to prevent breakage of the liquid crystal display panel.

Figure 7:
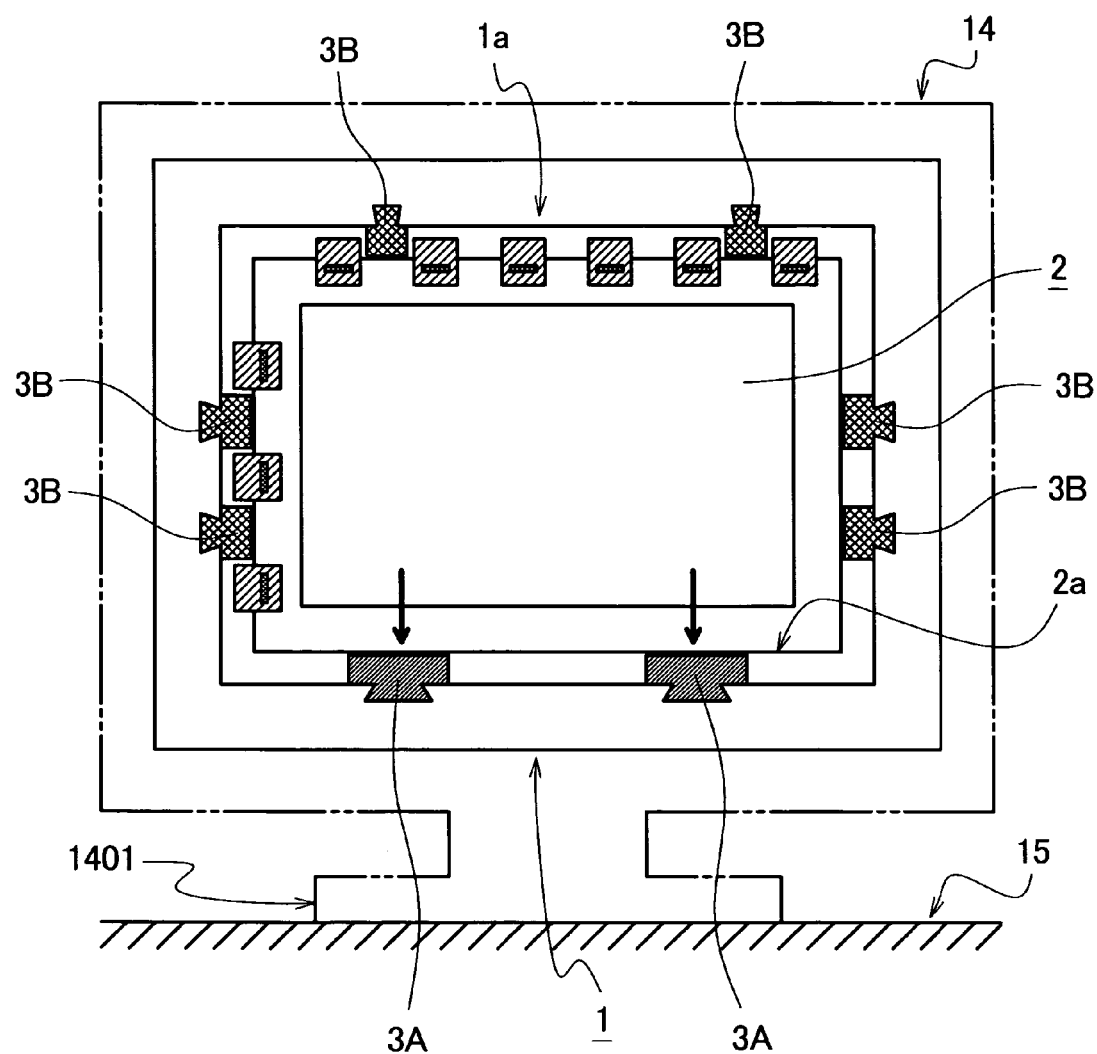
FIG. 7 is a diagrammatic view for explaining a first application of the display device of the invention.

FIG. 7 is a diagrammatic view for explaining a first application of the display device of the invention.

The display panel 2, the support member 1 and the like of the display device of the invention integrally held together by the frame members 11 and 12 are, for example as shown in FIG. 7, housed in an enclosure 14 having a base mount 1401. The external shape of the display panel 2 is rectangular when viewed from the image display plane side, and first spacers 3 are disposed at the upper and lower sides as well as the right and left sides of the display panel 2 when the display device is set up on an installation surface 15, such as a desktop.

In such a situation, a first spacer 3A that faces the lower cut end surface of the display panel 2 receives an external force corresponding to the weight of the display panel 2, unlike first spacers 3B that face the other cut end surfaces. Thus, the first spacer 3A that faces the lower cut end surface of the display panel 2 is preferably more resistant to deformation than the first spacers 3B that face the other cut end surfaces.

The display device of the invention is essentially designed to not only improve workability when attaching the first spacer 3 to the support member 1 but also prevent a positional shift of the first spacer 3 by providing the support member 1 with the recess 101 that opens through the first surface 1a and the second surface 1b as well as providing the first spacer 3 with the spacer position securing portion 301 that fits in the recess 101 of the support member 1. Therefore, the shape of the recess 101 of the support member 1 and the spacer position securing portion 301 of the first spacer 3 is not limited to that shown in FIGS. 2 and 3, but may be various other conceivable shapes.

Figure 8:
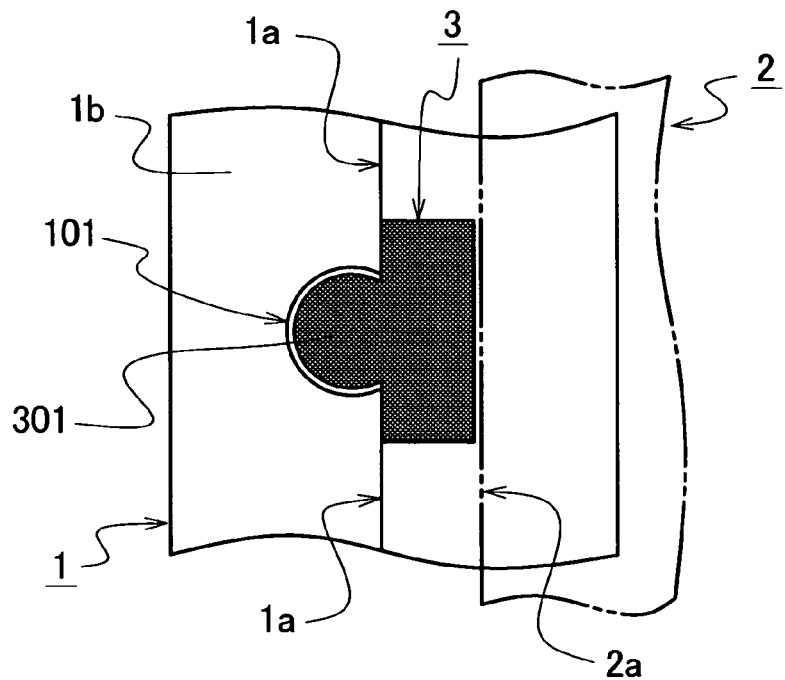
FIG. 8 is a diagrammatic view for explaining a first variation of the display device of the invention.

FIG. 8 is a diagrammatic view for explaining a first variation of the display device of the invention.

As for the shape of the recess 101 of the support member 1 and the spacer position securing portion 301 other than the shape shown in FIGS. 2 and 3, it is conceivable to shape the open end of the recess 101 of the support member 1 at the second surface 1b into an arc, for example as shown in FIG. 8. In this case, when the distance between the center of the arc of the open end and the cut end surface 2a of the display panel 2 is larger than the distance between the first surface 1a of the support member 1 and the cut end surface 2a of the display panel 2, the central angle of the arc becomes greater than 180 degrees, so that the width of the open end at the first surface 1a becomes smaller than the diameter of the arc. This prevents the movement of the first spacer 3 in the horizontal direction, which is perpendicular to the first surface 1a, as well as in the vertical direction, which is parallel to the first surface 1a and the second surface 1b.

Figure 9:
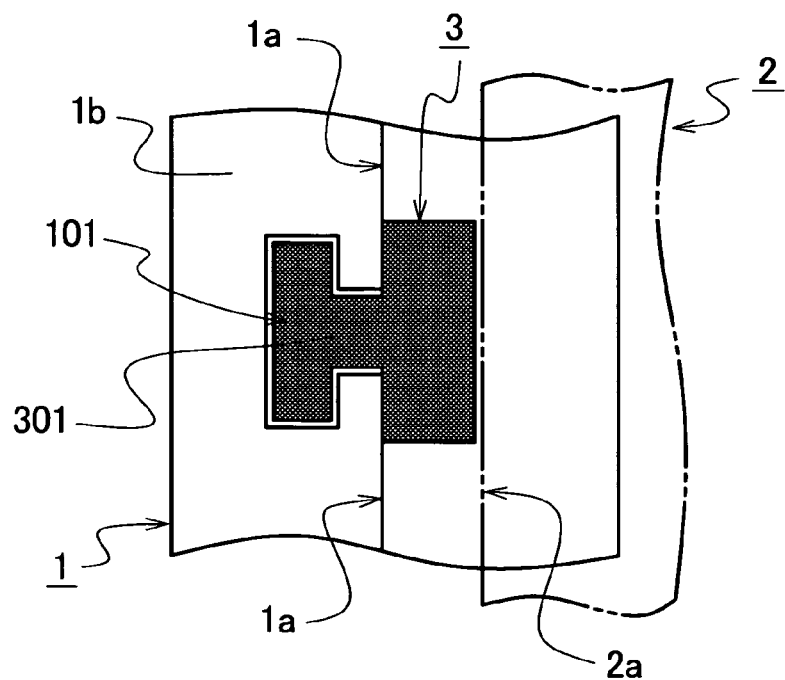
FIG. 9 is a diagrammatic view for explaining a second variation of the display device of the invention.

FIG. 9 is a diagrammatic view for explaining a second variation of the display device of the invention.

As for other shapes of the recess 101 of the support member 1 and the spacer position securing portion 301, it is conceivable to shape the open end of the recess 101 of the support member 1 at the second surface 1b, for example, as shown in FIG. 9. Such a shape also prevents the movement of the first spacer 3 in the horizontal direction, which is perpendicular to the first surface 1a, as well as in the vertical direction, which is parallel to the first surface 1a and the second surface 1b.

Figure 10:
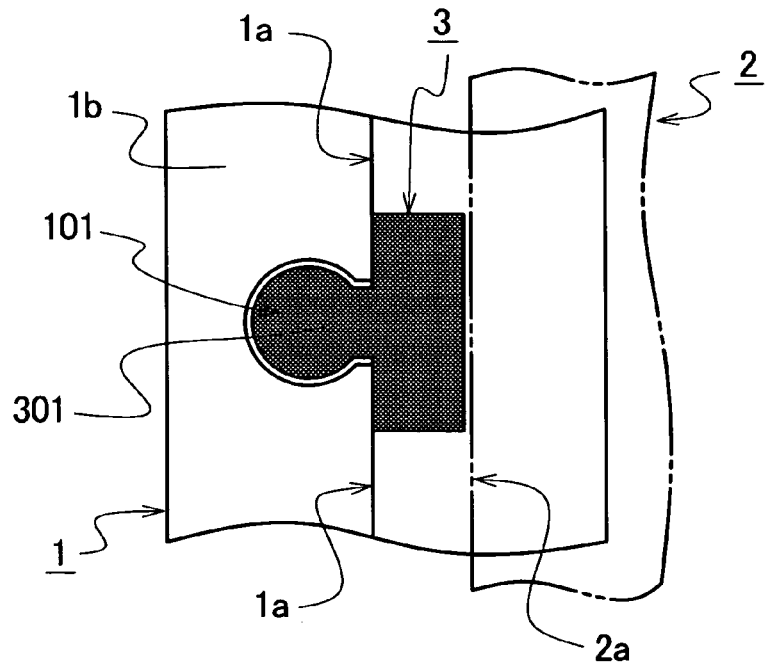
FIG. 10 is a diagrammatic view for explaining a third variation of the display device of the invention.

FIG. 10 is a diagrammatic view for explaining a third variation of the display device of the invention.

As for other shapes of the recess 101 of the support member 1 and the spacer position securing portion 301 of the first spacer 3, it is conceivable to shape the open end of the recess 101 of the support member 1 at the second surface 1b, for example, as shown in FIG. 10. In the case of the shape shown in FIG. 9, it may not be easy to distinguish the shape of the spacer position securing portion 301 from the similar shape of the portion interposed between the first surface 1a and the display panel 2. Therefore, by shaping part of the spacer position securing portion 301 into an arc as shown in FIG. 10, the operator can easily determine which side is the spacer position securing portion 301 in the attachment process.

Each of the first spacers 3 listed above has a box-shaped portion (buffer portion) interposed between the first surface 1a of the support member 1 and the cut end surface 2a of the display panel 2. However, since the buffer portion only needs to absorb vibration or impact, the shape of the buffer portion is not limited to the box shape, but may be various other conceivable shapes.

Figure 11:
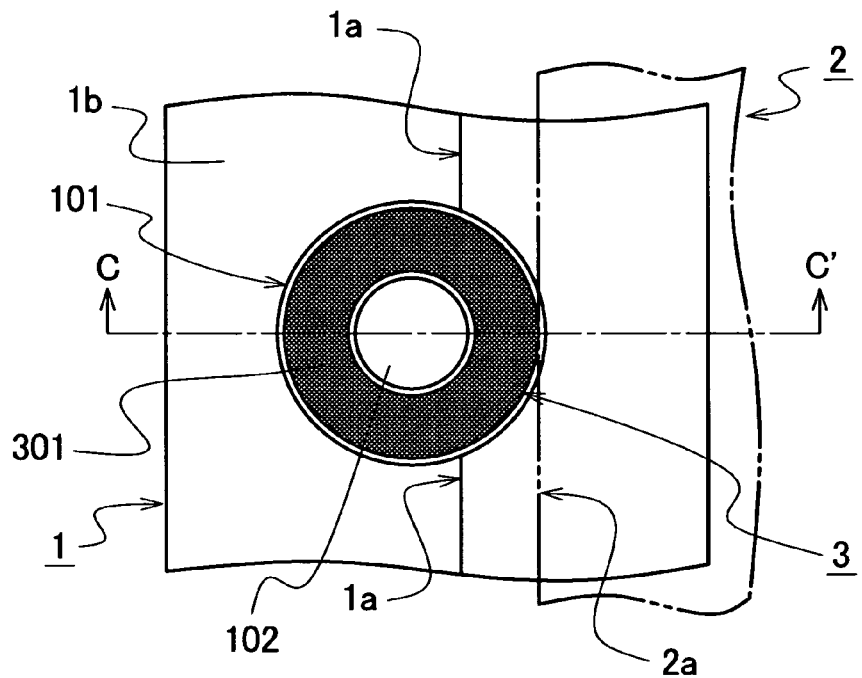
FIG. 11 is a diagrammatic view for explaining a fourth variation of the display device of the invention and is a plan view when viewed from the second surface side of the support member.
Figure 12:
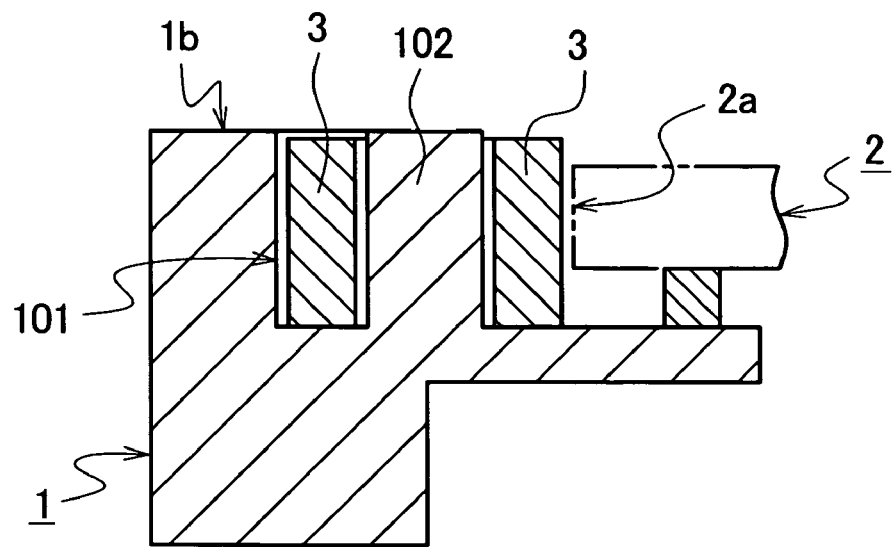
FIG. 12 is a diagrammatic view for explaining the fourth variation of the display device of the invention and is a cross-sectional view taken along the line C-C' shown in FIG. 11.

FIGS. 11 and 12 are diagrammatic views for explaining a fourth variation of the display device of the invention. FIG. 11 is a plan view when viewed from the second surface side of the support member. FIG. 12 is a cross-sectional view taken along the line C-C' shown in FIG. 11.

As for the shape of the first spacer 3 in which the buffer portion does not have the box-like shape, it is conceivable to shape the spacer 3 into a cylinder, for example as shown in FIGS. 11 and 12. The bottom of the cylinder is configured to be parallel to the second surface 1b of the support member 1, and the open end of the recess 101 of the support member 1 at the second surface 1b is shaped into an arc concentric with the side of the cylinder, so that part of the cylinder protrudes from the first surface 1a of the support member 1 toward the cut end surface 2a of the display panel 2. In this way, the protruding portion of the first spacer 3 serves as a buffer. When the distance between the center axis of the first spacer 3 and the cut end surface 2a of the display panel 2 is larger than the distance between the first surface 1a of the support member 1 and the cut end surface 2a of the display panel 2, the central angle of the arc becomes greater than 180 degrees, so that the width of the open end at the first surface 1a becomes smaller than the diameter of the arc. This prevents the movement of the first spacer 3 in the horizontal direction, which is perpendicular to the first surface 1a, as well as in the vertical direction, which is parallel to the first surface 1a and the second surface 1b. Furthermore, as shown in FIGS. 11 and 12, if the support member 1 is provided with a column-like projection 102 in the internal area of the cylindrical first spacer 3, the ability to prevent the movement of the first spacer 3 is further enhanced.

Figure 13:
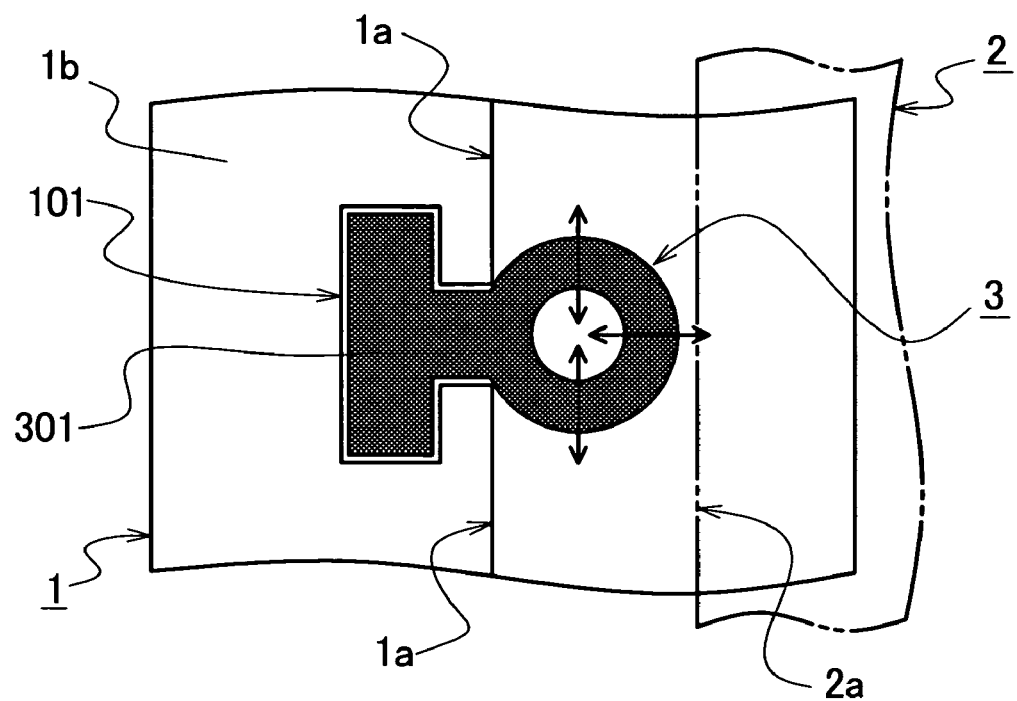
FIG. 13 is a diagrammatic view for explaining a fifth variation of the display device of the invention.

FIG. 13 is a diagrammatic view for explaining a fifth variation of the display device of the invention.

As for other shapes of the first spacer in which the buffer portion does not have the box-like shape, it is conceivable to shape the buffer portion into a cylinder, for example as shown in FIG. 13. This shape can convert vibration or impact applied in the horizontal direction into that acting in the vertical direction, so that the vibration or impact can be efficiently absorbed.

Figure 14:
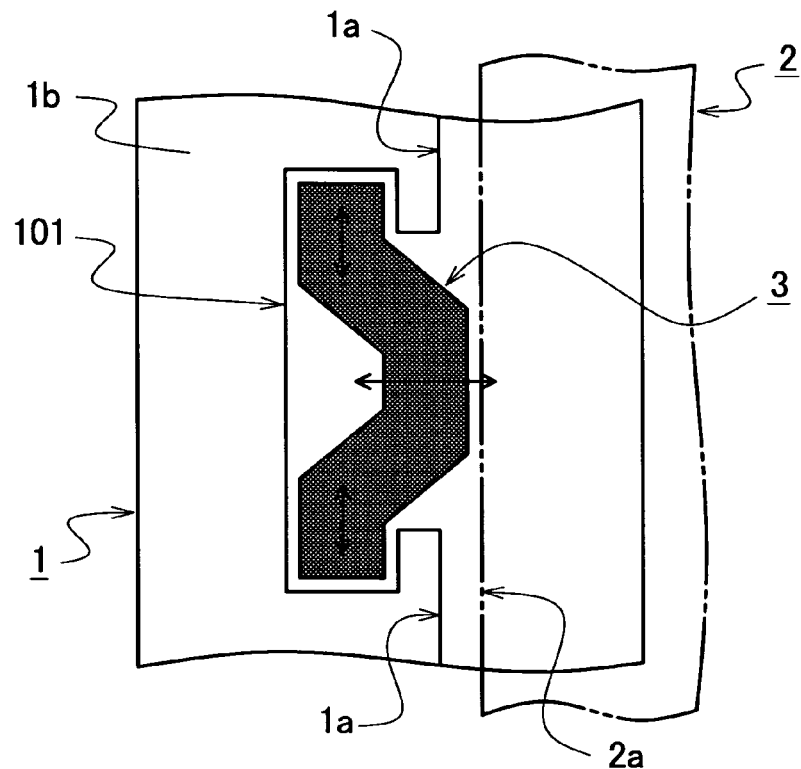
FIG. 14 is a diagrammatic view for explaining a sixth variation of the display device of the invention.

FIG. 14 is a diagrammatic view for explaining a sixth variation of the display device of the invention.

In the above examples of the shape of the recess 101 of the support member 1 and the first spacer 3, the shape of the spacer position securing portion 301 of the first spacer 3 is conformal to the shape of the open end of the recess 101 of the support member 1 at the second surface 1b, so that the spacer position securing portion 301 fitted in the recess 101 prevents the movement of the first spacer 3. However, in the display device of the invention, for example as shown in FIG. 14, the central portion of a reverse V-shaped first spacer 3 may protrude from the first surface 1a of the support member 1, while the skirts of the first spacer 3 may fit in the recess 101 of the support member 1. This shape can convert vibration or impact applied in the horizontal direction into that acting in the vertical direction, so that the vibration or impact can be efficiently absorbed, as in the example shown in FIG. 13.

Figure 15:
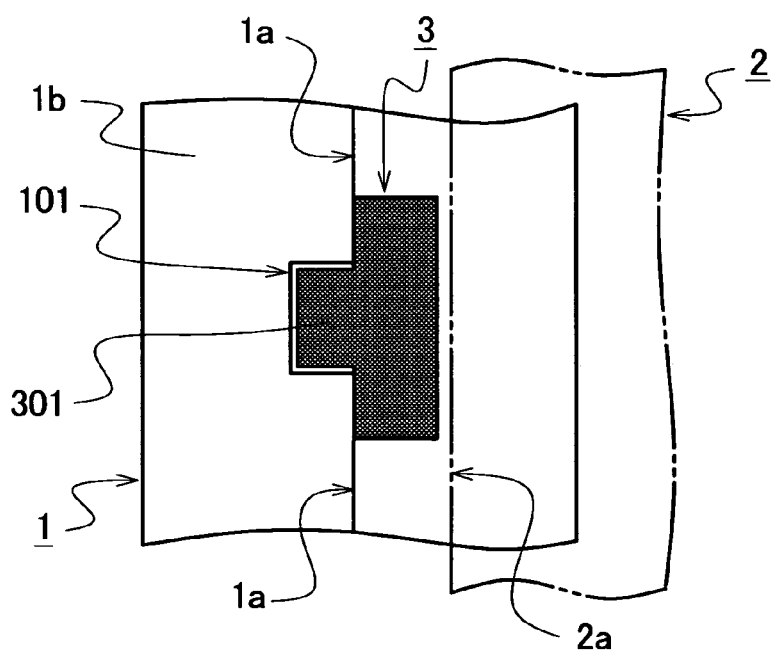
FIG. 15 is a diagrammatic view for explaining a seventh variation of the display device of the invention.
Figure 16:
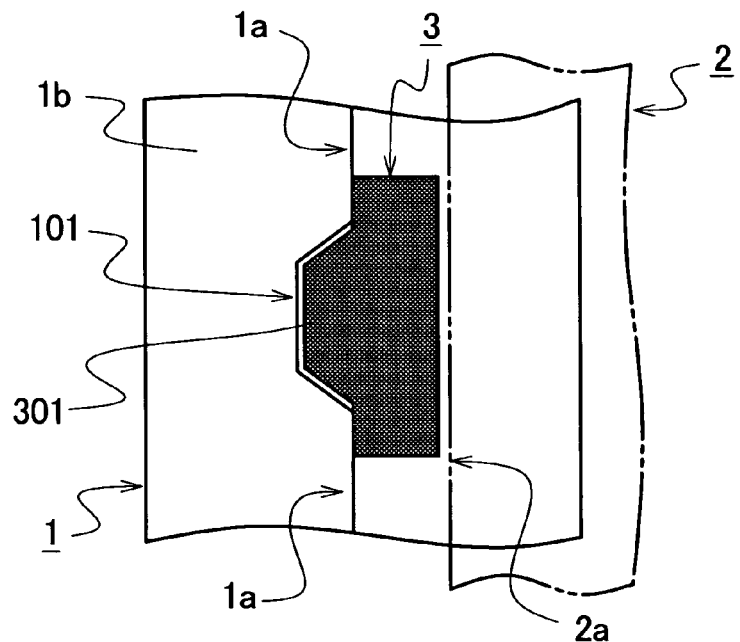
FIG. 16 is a diagrammatic view for explaining an eighth variation of the display device of the invention.

FIG. 15 is a diagrammatic view for explaining a seventh variation of the display device of the invention. FIG. 16 is a diagrammatic view for explaining an eighth variation of the display device of the invention.

The shapes of the open end of the recess 101 of the support member 1 at the second surface listed above are configured such that the portion inside the first surface 1a is wider than the open end at the first surface 1a. However, the requirement of the display device of the invention is to prevent the movement of the first spacer 3 only after the display panel 2 is installed. Thus, the shape of the open end at the second surface 1b may be rectangular, for example as shown in FIG. 15.

Considering that the requirement is to prevent the movement of the first spacer 3 only after the display panel 2 is installed, the shape of the open end at the second surface 1b may be, for example as shown in FIG. 16, a trapezoid in which two sides are parallel to the first surface 1a and one side on the first surface 1a is longer than the other side.

Figure 17:
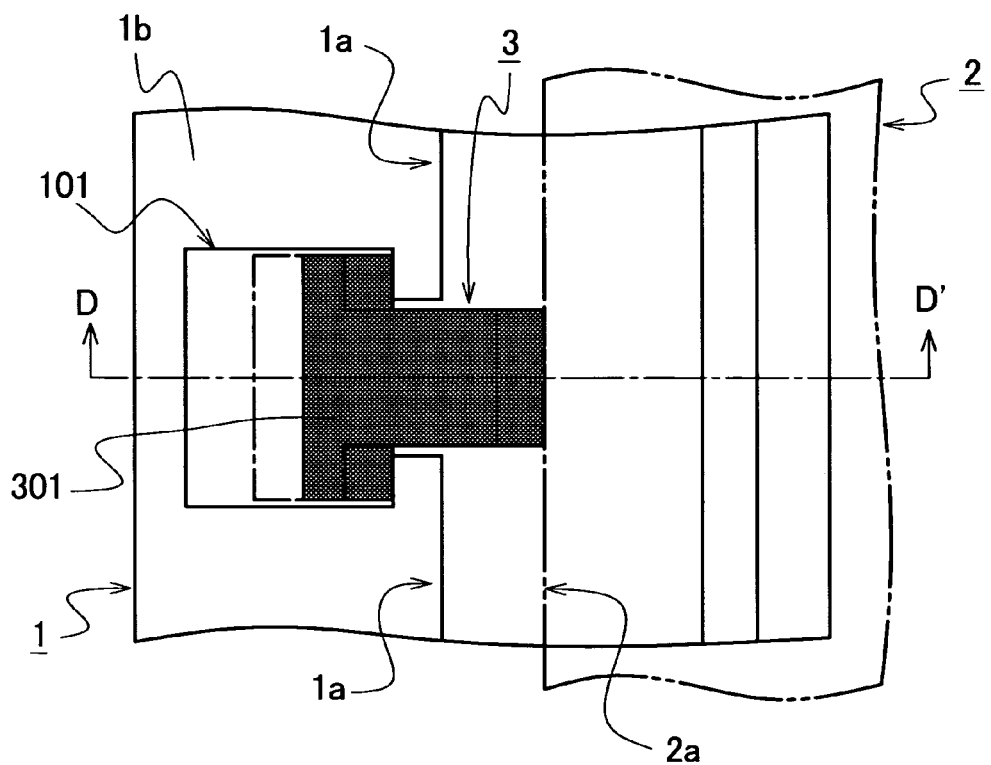
FIG. 17 is a diagrammatic view for explaining a second application of the display device of the invention and is a front view showing a schematic configuration of the support member and the spacer.
Figure 18:
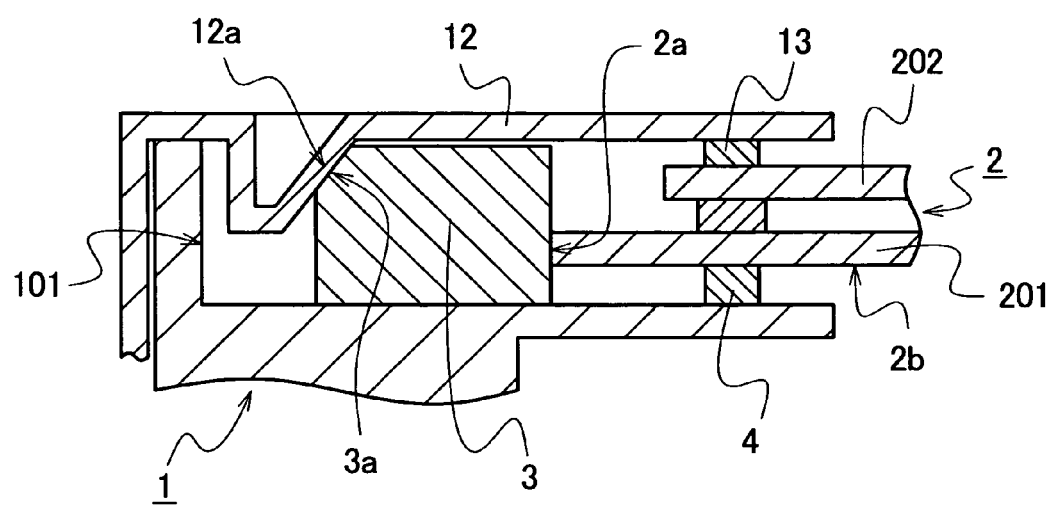
FIG. 18 is a diagrammatic view for explaining the second application of the display device of the invention and is a cross-sectional view taken along the line D-D' shown in FIG. 17.

FIGS. 17 and 18 are diagrammatic views for explaining a second application of the display device of the invention. FIG. 17 is a front view showing a schematic configuration of the support member and the spacer. FIG. 18 is a cross-sectional view taken along the line D-D' shown in FIG. 17.

In the display device of the invention, as shown in FIG. 6, the upper frame 12 prevents the movement of the first spacer 3 in the direction perpendicular to the second surface 1b of the support member 1. However, in this method in which the first spacer 3 is fixed, for example, variations in external dimensions of the first spacer 3 and the display panel may widen the gap between the first spacer 3 and the display panel 2, thereby reducing positional accuracy of the display panel 2.

Therefore, the first spacer 3 is preferably configured to be able to move in the direction perpendicular to the first surface 1a of the support member 1, so that the first spacer 3 comes into contact with the display panel 2 or the gap between the first spacer 3 and the display panel 2 is reduced.

To this end, the open end of the recess 101 of the support member 1 at the second surface 1b is configured, for example, to be larger than the spacer position securing portion 301 of the first spacer 3, so that the spacer position securing portion 301 can move in the direction perpendicular to the first surface 1a of the support member 1. Furthermore, for example as shown in FIG. 18, the spacer position securing portion 301 of the first spacer 3 is provided with a surface 3a that is inclined with respect to the second surface 1b of the support member 1 such that the surface 3a becomes further away from the second surface 1b at more distal positions from the open end at the first surface 1a of the support member 1. Correspondingly, the upper frame 12 is provided with a projection 12a that is disposed on a surface opposite to and parallel to the second surface 1b of the support member 1 and in the area corresponding to the recess 101 of the support member 1, such that the projection 12a is in contact with the inclined surface 3a of the spacer position securing portion 301.

Figure 19A:
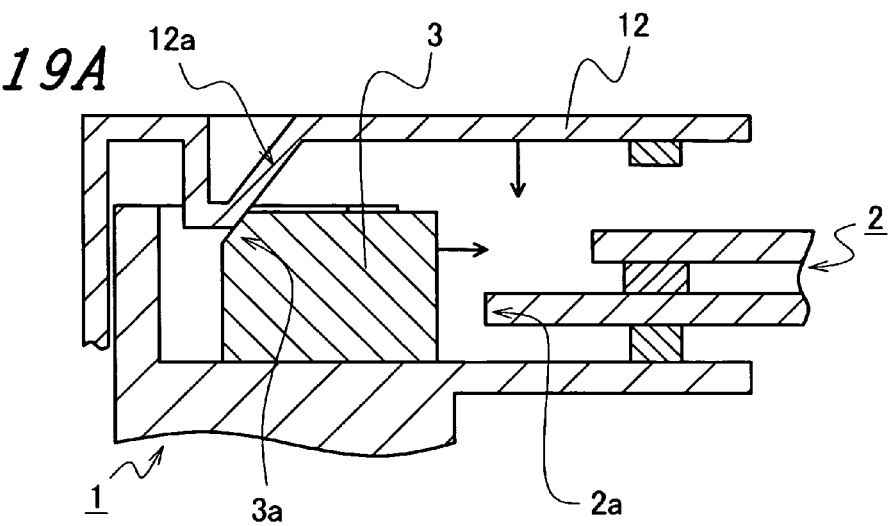
FIG. 19 is a diagrammatic view for explaining how to assemble the display device shown in FIGS. 17 and 18.
Figure 19B:
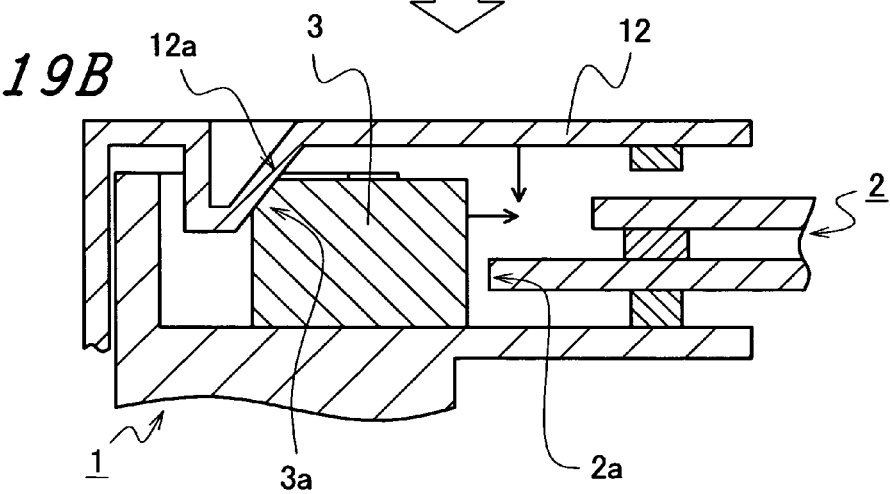
Figure 19C:
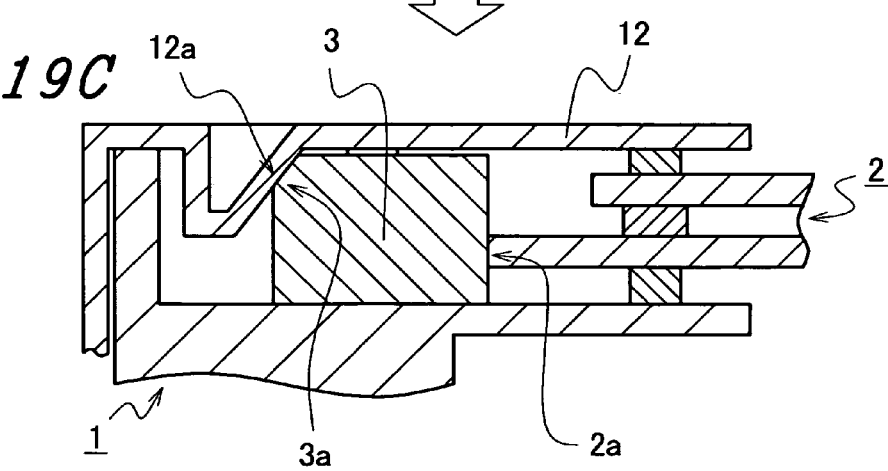

FIG. 19 is a diagrammatic view for explaining how to assemble the display device shown in FIGS. 17 and 18.

In the display device shown in FIGS. 17 and 18, when the spacer position securing portion 301 of the support member 1 fits in the recess 101 of the support member 1, the amount the buffer portion of the first spacer 3 protrudes from the first surface 1a of the support member 1 is not consistent.

When the first spacer 3 is attached to the support member 1 and then the display panel 2 is placed, followed by the overlying upper frame 12, for example as shown in FIG. 19, the inclined surface of the projection 12a of the upper frame 12 comes into contact with the inclined surface 3a of the spacer position securing portion 301 of the first spacer 3. As the assembly of the upper frame 12 proceeds, the inclined surface of the projection 12a of the upper frame 12 slides on the inclined surface 3a of the spacer position securing portion 301 of the first spacer 3 and shifts the first spacer 3 toward the display panel 2. As a result, the first spacer 3 comes into contact with the display panel 2.

Figure 20:
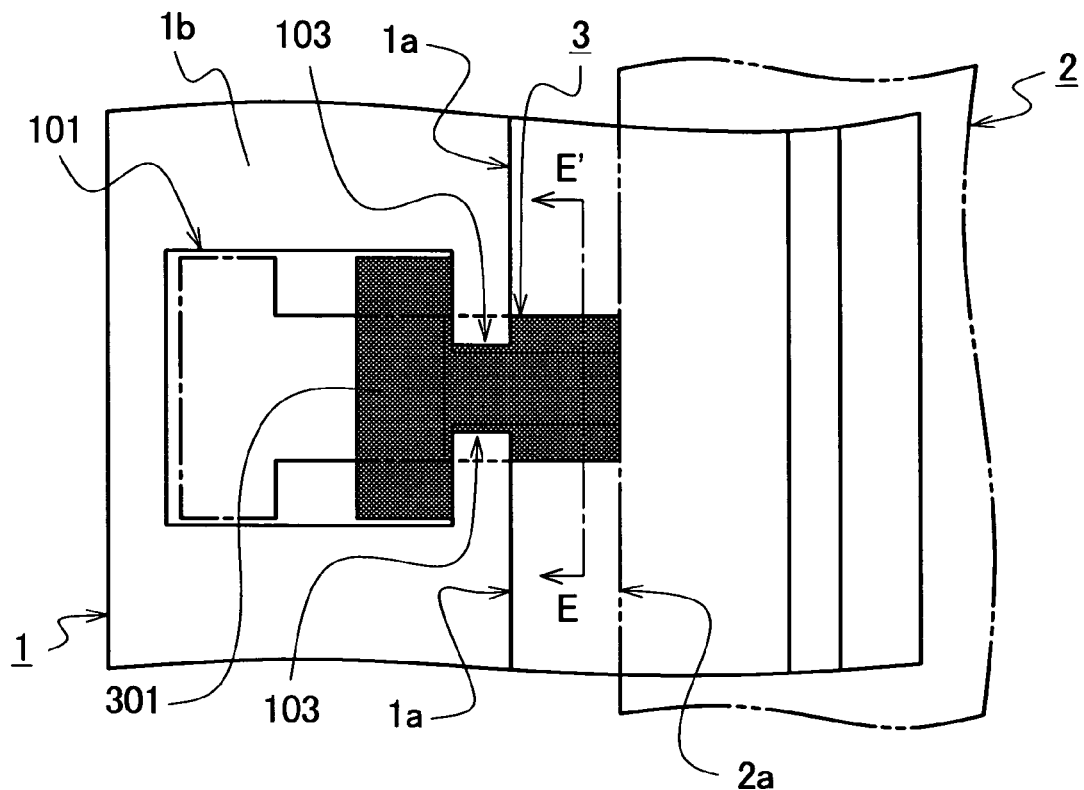
FIG. 20 is a diagrammatic view for explaining a variation of the second application and is a front view showing a schematic configuration of the support member and the spacer.
Figure 21:
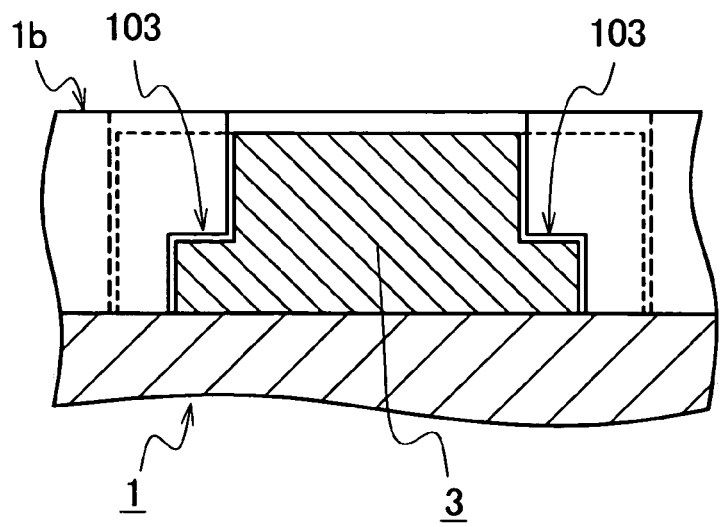
FIG. 21 is a diagrammatic view for explaining the variation of the second application and is a cross-sectional view taken along the line E-E' shown in FIG. 20.
Figure 22:
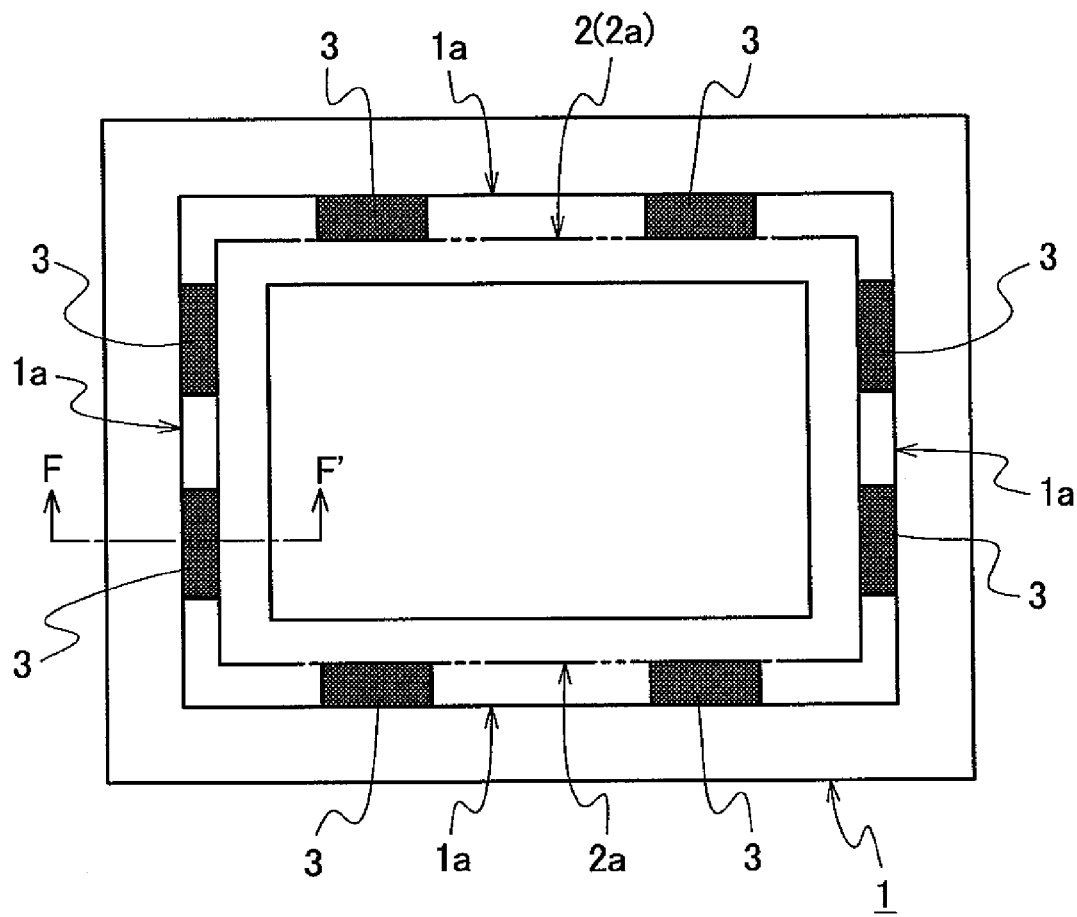
FIG. 22 is a front view showing a schematic configuration of the support member and the spacer of a conventional display device.
Figure 23:
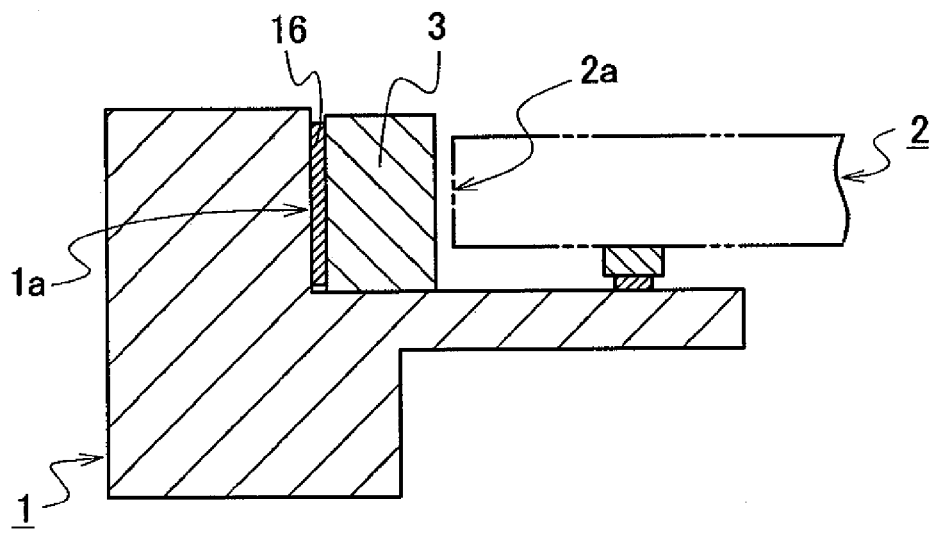
FIG. 23 is an exemplary cross-sectional view taken along the line F-F' shown in FIG. 22.
Figure 24:
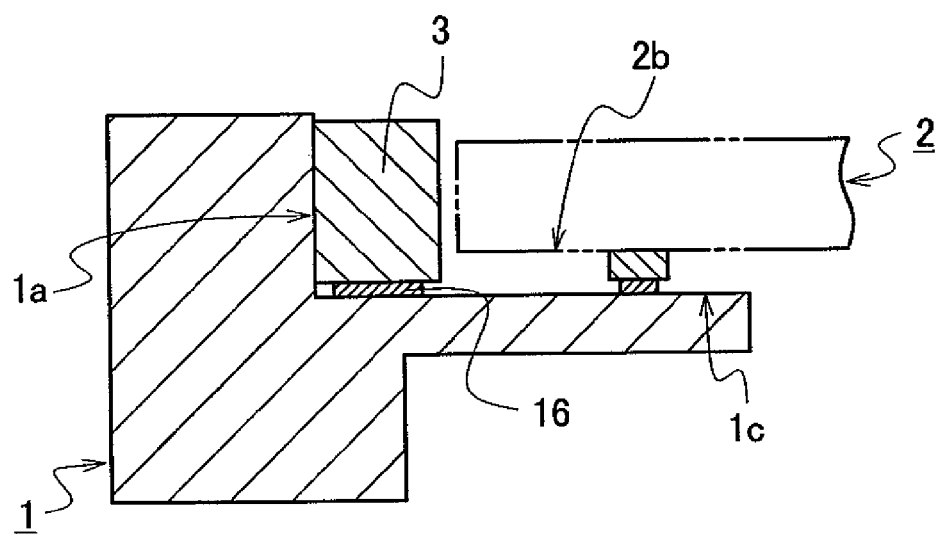
FIG. 24 is another exemplary cross-sectional view taken along the line F-F' shown in FIG. 22.

FIGS. 20 and 21 are diagrammatic views for explaining a variation of the second application. FIG. 20 is a front view showing a schematic configuration of the support member and the spacer. FIG. 21 is a cross-sectional view taken along the line E-E' shown in FIG. 20.

In the second application of the display device of the invention, the first spacer 3 is configured to move only in the direction perpendicular to the first surface 1a of the support member 1 so as to narrow the gap between the first spacer 3 and the display panel 2. In this configuration, the upper frame 12 can prevent the movement of the first spacer 3 in the direction perpendicular to the second surface 1b of the support member 1. Thus, the width of the buffer portion of the first spacer 3 may be narrower than the width of the open end at the first surface 1a of the support member 1. In this case, however, for example, the overlaid upper frame 12 may not move the first spacer 3, but instead may lift the buffer portion toward the second surface 1b of the support member 1, or may move the first spacer 3 in a diagonal direction.

To avoid this, for example as shown in FIGS. 20 and 21, a guide 103 may be provided in the vicinity of the first surface 1a of the support member 1 so as to smoothly move the buffer portion of the first spacer 3.

As described above, according to the display device of the invention, the operator does not have to affix the first spacer 3 with an adhesive, but can position the first spacer 3 between the first surface 1a of the support member 1 and the cut end surface 2a of the display panel 2.

The first spacer 3 can be attached to the support member 1 by inserting the spacer position securing portion 301 of the first spacer 3 into the opening of the recess 101 of the support member 1 at the second surface 1b through the space of the recess 101 of the support member 1, thereby providing improved workability in the attachment process of the first spacer 3.

Since the first spacer 3 can be positioned only by fitting the spacer position securing portion 301 in the recess 101 of the support member 1, it is not necessary to use an adhesive or form the first spacer 3 integral with the support member 1.

That is, in the display device of the invention, the first spacer 3 is removably attached to the support member 1. Furthermore, in the display device to which the invention is directed, the support member 1 and the first spacer 3 are usually made of materials different from each other. Thus, when the first spacer 3 is removably attached as in the display device of the invention, the first spacer 3 can be easily removed from the support member 1 and separately sorted, for example, when the display device is discarded or disassembled for reuse.

Although a liquid crystal display device having an underneath-type backlight unit shown in FIG. 6 is described as an example of the display device to which the invention is directed, the invention is not limited thereto, but may be of course applied to other differently configured liquid crystal display devices.

Furthermore, the invention is not limited to a liquid crystal display device, but may be applied to display devices with any configuration as long as they have a display panel, a support member that supports the display panel and a spacer that is interposed between the display panel and the support member.

Although the invention has been specifically described with reference to the above embodiments, the invention is not limited to the above embodiments. Various changes can be of course made thereto without departing from the spirit of the invention.

What is claimed is:

1. A display device comprising:
   a display panel;
   a support member that supports the display panel; and
   at least one spacer that is interposed between a cut end surface of the display panel and a first surface of the support member, the first surface facing the cut end surface of the display panel;
   wherein the support member has a recess with an open end that opens through the first surface and a second surface, the second surface being connected to the first surface and extending in parallel to a display surface of the display panel;
   wherein the spacer includes a spacer position securing portion inserted in the space of the recess of the support member and a buffer portion that is integral with the spacer position securing portion and protrudes from the open end at the first surface of the support member toward the cut end surface of the display panel;
   wherein the spacer is made of an elastic material;
   wherein a plurality of the spacers are provided; and
   wherein at least one of the spacers of the plurality of spacers has a modulus of elasticity different from a modulus of elasticity of an other of the spacer of the plurality of spacers.

2. The display device according to claim 1, wherein the recess of the support member is configured such that the area of the open end at the second surface is equal to or greater than an area of the external shape of the spacer position securing portion at a surface parallel to the second surface.

3. The display device according to claim 1, wherein the spacer position securing portion has a portion whose width in an direction parallel to the first and second surfaces of the support member is wider than a width of the open end at the first surface.

4. A display device comprising:
   a display panel;
   a support member that supports the display panel;
   at least one spacer that is interposed between a cut end surface of the display panel and a first surface of the support member, the first surface facing the cut end surface of the display panel; and a frame member that covers the support member and a peripheral portion of the display surface of the display panel;

wherein the support member has a recess with an open end that opens through the first surface and a second surface, the second surface being connected to the first surface and extending in parallel to the display surface of the display panel;

wherein the at least one spacer includes a spacer position securing portion inserted in the space of the recess of the support member and a buffer portion that is integral with the spacer position securing portion and protrudes from the open end at the first surface of the support member toward the cut end surface of the display panel;

wherein the spacer position securing portion has an inclined surface that on a side of the frame member; and wherein the frame member has a projection that is disposed on a surface opposite to and parallel to the second surface of the support member and in an area corresponding to the recess of the support member such that the projection is in contact with the inclined surface of the spacer position securing portion.

5. The display device according to claim 4, wherein the at least one spacer is made of an elastic material.

6. The display device according to claim 5, wherein a plurality of the spacers are provided and at least one of the spacers of the plurality of spacers has a modulus of elasticity different from a modulus of elasticity of an other of the spacers of the plurality of spacers.

7. The display device according to claim 1 or 4, wherein the display panel is a liquid crystal display panel.

* * * * *